United States Patent
Sun et al.

(10) Patent No.: US 8,774,460 B2
(45) Date of Patent: Jul. 8, 2014

(54) METHOD OF PROCESSING BODY INSPECTION IMAGE AND BODY INSPECTION APPARATUS

(75) Inventors: Yunda Sun, Beijing (CN); Xuewu Wang, Beijing (CN); Lian Wang, Beijing (CN); Yumin Yi, Beijing (CN); Ming Chen, Beijing (CN)

(73) Assignee: Nuctech Company Limited, Beijing (CN)

( * ) Notice: Subject to any disclaimer, the term of this patent is extended or adjusted under 35 U.S.C. 154(b) by 170 days.

(21) Appl. No.: 13/499,045

(22) PCT Filed: Jul. 2, 2010

(86) PCT No.: PCT/CN2010/074898
§ 371 (c)(1),
(2), (4) Date: Mar. 29, 2012

(87) PCT Pub. No.: WO2011/038607
PCT Pub. Date: Apr. 7, 2011

(65) Prior Publication Data
US 2012/0189165 A1    Jul. 26, 2012

(30) Foreign Application Priority Data
Sep. 30, 2009 (CN) .......................... 2009 1 0235340

(51) Int. Cl.
*G06K 9/00* (2006.01)
(52) U.S. Cl.
USPC .......................................................... 382/103

(58) Field of Classification Search
CPC .............................. A61B 5/0077; A61B 5/002
See application file for complete search history.

(56) References Cited

U.S. PATENT DOCUMENTS

| | | | |
|---|---|---|---|
| 7,405,692 B2 | 7/2008 | McMakin et al. | 342/22 |
| 2003/0223622 A1* | 12/2003 | Simon et al. | 382/118 |
| 2004/0120581 A1* | 6/2004 | Ozer et al. | 382/224 |
| 2008/0212742 A1* | 9/2008 | Hughes | 378/98.12 |
| 2010/0124359 A1* | 5/2010 | Vaidya | 382/103 |

FOREIGN PATENT DOCUMENTS

| | | |
|---|---|---|
| CA | 2514724 | 2/2007 |
| CN | 101510957 | 8/2009 |
| WO | WO 2005/086620 | 9/2005 |
| WO | WO 2009/082762 | 7/2009 |

OTHER PUBLICATIONS

The International Search Report (English translation) and Written Opinion (in Chinese) for PCT Application No. PCT/CN2010/074898, dated Oct. 8, 2010, 8 pages.

* cited by examiner

*Primary Examiner* — Atiba O Fitzpatrick
(74) *Attorney, Agent, or Firm* — Westman, Champlin & Koehler, P.A.

(57) ABSTRACT

A method of processing a body inspection image and a body inspection apparatus are disclosed. In one embodiment, the method may comprise recognizing a target region by means of pattern recognition, and performing privacy protection processing on the recognized target region. The target region may comprise a head and/or crotch part. According to the present disclosure, it is possible to achieve a compromise between privacy protection and body inspection.

21 Claims, 5 Drawing Sheets

METHOD OF PROCESSING BODY INSPECTION IMAGE AND BODY INSPECTION APPARATUS

CROSS-REFERENCE TO RELATED APPLICATION

This Application is a Section 371 National Stage Application of International Application No. PCT/CN2010/074898, filed 2 Jul. 2010 and published as WO 2011/038607 on 7 Apr. 2011, in Chinese, the contents of which are hereby incorporated by reference in their entirety.

TECHNICAL FIELD

The present disclosure generally relates to the field of human body security check, and more particularly, to a method of processing a body inspection image and a body inspection apparatus.

BACKGROUND

In human body security check systems such as those utilizing X-rays, a body inspection image formed due to transmission or scattering of the rays contains anatomical characteristics inside or outside the human body. The security check, on one hand, needs to recognize from the image hidden contrabands such as guns, knives, explosives, and pellets of drugs swallowed inside, and on the other hand, should avoid causing public's concerns about invasion of privacy so as not to incur challenges and criticisms from the public.

Generally, some details of the body can be obscured by adjusting brightness and contrast of the image, which enhances inorganic matters such as metal while protecting privacy of a person under inspection. However, this will also obscure organic matters such as explosives and drugs, which are in low contrast to human tissues, causing serious safety troubles. The conventional image processing technology is capable of blurring anatomic details of the body, for example, by means of edge enhancement and filtering with respect to the whole image. However, it causes difficulties in recognizing suspicious objects which are thin, small-sized and light-weighted, resulting in a reduced possibility of detecting the contrabands.

To improve both the capability of detecting the contrabands and the privacy, protection level, some scanning systems segment the body inspection image into a foreground portion and a background portion or into a high-scattering portion and a low-scattering portion, and apply different image processes on the different portions before combining them again. For example, in the foreground portion, body details may be smoothed and inorganic matters such as metal may be enhanced based on a result of database-based comparison; while in the background portion, edge detection and enhancement may be performed. This brings significant advantages over the conventional technology. However, existing artificial intelligence algorithms cannot achieve a reliable automatic detection of contrabands which are irregular in shape and low in contrast, such as pellets of drugs swallowed inside or explosives in form of pieces hidden at the abdomen part in a low-dose X-ray transmission image. If such contrabands are deemed being body details and thus are smoothed, the image effect actually degrades with respect to that before blurring. This virtually increases the uncertainty of such scanning systems in detecting the contrabands.

Therefore, there is a need for a method of processing a body inspection image and a body inspection apparatus, by which it is possible to achieve a compromise between the privacy protection and the contraband detection.

SUMMARY

In view of the above, there are disclosed a method of processing a body inspection image and a body inspection apparatus, by which it is possible to achieve a compromise between privacy, protection and contraband detection. As a result, it is possible to, on one hand, satisfy the public's needs for privacy protection in security check, and to, on the other hand, prevent, as far as possible, the capacity of detecting contrabands from being impaired by the privacy protection processing on the body inspection image.

According to an embodiment, there is provided a method of processing a body inspection image. The method may comprise recognizing a target region by means of pattern recognition and performing privacy protection processing on the recognized target region. The target region may comprise a head and/or crotch part.

According to a further embodiment, there is provided a body inspection apparatus. The apparatus may comprise an image acquiring section, an image processing section, and an output section. The image acquiring section may be configured to acquire a body inspection image by imaging a human body. The image processing section may be configured to processing the acquired body inspection image. The output section may be configured to output the image processed by the image processing section. The image processing section may comprise a pattern recognition unit and a process unit. The pattern recognition unit may be configured to identify a target region by means of pattern recognition. The process unit may be configured to perform privacy protection processing on the recognized target region. Here, the target region may comprise a head and/or crotch part.

According to various embodiments of the present disclosure, the trunk, head and crotch parts can be reliably positioned in the body inspection image with the pattern recognition technology. As a result, it is possible to perform privacy protection processing on the key privacy parts such as head and crotch. For example, the privacy protection processing may comprise smoothing, masking, or edging. Therefore, it is possible to effectively ensure the privacy of a person under inspection, to eliminate legal obstacles to the safety check, to avoid image information loss caused by error processes occurring upon failure in intelligent detection of contrabands or anatomical characteristics, and to improve the reliability of detecting the contrabands. The present disclosure can find an application particularly in privacy protection in low-dose X-ray transmission images.

BRIEF DESCRIPTION OF THE DRAWINGS

Hereinafter, embodiments will be described in detail with reference to the attached drawings, in which.

DETAILED DESCRIPTION

Figure 1A:
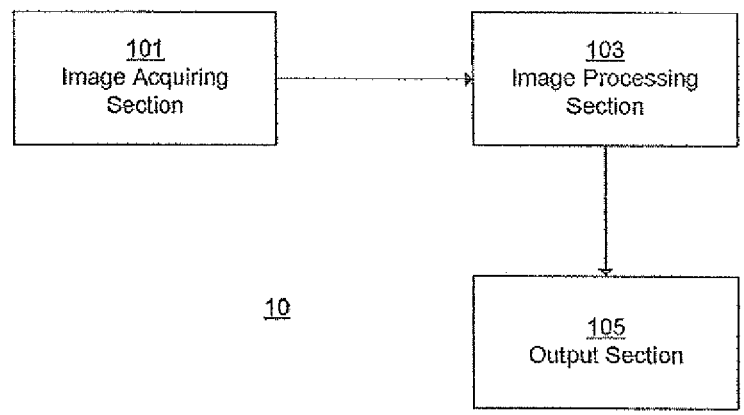
FIG. 1A is a block diagram showing a body inspection apparatus according to an embodiment of the present disclosure.

Various embodiments of the present disclosure are described below with reference to the attached drawings which illustrate some examples of the present disclosure. However, it is to be noted that those examples shown in the drawings are just provided for illumination of the present disclosure, but are not intended to limit the present disclosure.

FIG. 1A is a block diagram showing a body inspection apparatus according to an embodiment of the present disclosure. As shown in FIG. 1A, the body inspection apparatus 10 according to this embodiment may comprise an image acquiring section 101, an image processing section 103 and an output section 105.

The image acquiring section 101 may be configured to image a target object by means of, for example, radiations such as X-rays. For example, in inspecting a human body, a body inspection image can be created by X-ray scanning. The image acquiring section can be implemented in various ways. All those image acquiring sections available currently or to be developed in future, which can acquire an image of the target object, are applicable to the present disclosure.

The image acquiring section 101 can be configured to transmit the acquired image to the image processing section 103 for further processing. The image processing section 103 can be configured to transmit the processed image to the output section 105 which in turn outputs the image to the outside. The output section 105 may comprise a display, for example. In such a case, an inspector can observe the image displayed on the output section 105 for security check, so as to determine whether a person under inspection secretly carries contrabands or not, for example.

According to an embodiment, in order to do some processing, such as privacy protection processing, on a target region of the image, such as privacy parts, e.g., the head and/or crotch, the image processing section 103 can be configured to recognize the target region and then process the recognized target region as needed. Hereinafter, the image processing section 103 will be described in more detail.

Figure 1B:
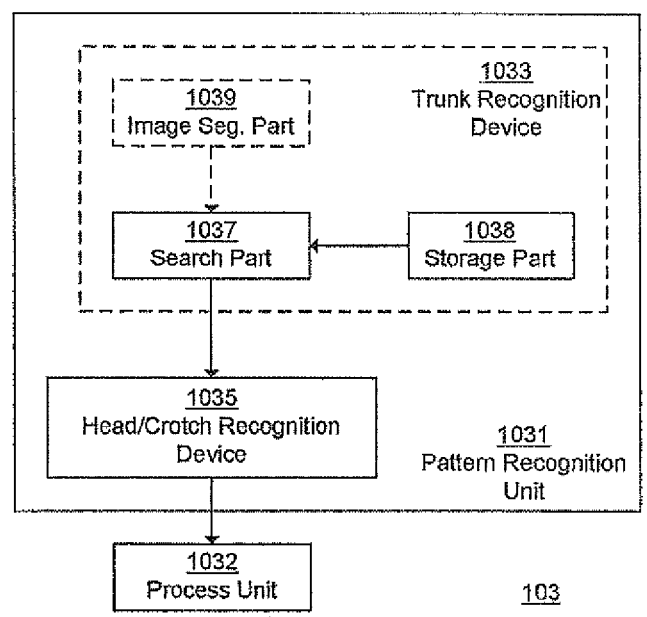
FIG. 1B is a block diagram showing an image processing section according to an embodiment of the present disclosure.

FIG. 1B is a block diagram showing an image processing section according to an embodiment of the present disclosure. As shown in FIG. 1B, the image processing section 103 according to this embodiment may comprise a pattern recognition unit 1031 and a process unit 1032. The pattern recognition unit 1031 may be configured to recognize a target region of the image to be processed, and the process unit 1032 may be configured to carry out processing such as particular privacy protection processing on the recognized target region. Here, so called "privacy protection processing" refers to processing on privacy parts of the human body so that details of the privacy parts will not be rendered. For example, such privacy protection processing may comprise smoothing and thus blurring the privacy parts, or masking the privacy parts, or just edging the privacy parts (by means of edge detection and then thresholding of the privacy parts, for example). As a result, the privacy of the person under inspection can be protected, without incurring unnecessary troubles.

Particularly, in inspecting the human body, the privacy parts such as head and crotch need to be processed. Thus, the pattern recognition unit 1031 can be configured to recognize the head and/or crotch. For this purpose, according to an embodiment the pattern recognition unit 1031 may comprise a trunk recognition device 1033 configured to recognize the trunk part and a head and/or crotch recognition device 1035 configured to recognize the head and/or crotch part, as shown in FIG. 1B. According to an embodiment, in the body image, the head and/or crotch part may be recognized by the head and/or crotch recognition device 1035 on basis of the trunk part which can be recognized by the trunk recognition device 1033.

However, it is to be noted that it is not necessary to recognize the trunk part before recognition of the head and/or crotch part. For example, those skilled in the art can devise such a solution where an uppermost region of about 1/10 in height of the body image can be recognized as the head part, and a region at a particular height of the body, based on the anatomical characteristics of the human body, can be recognized as the crotch part. Preferably, the head and/or crotch part can be better recognized based on the trunk part, as described below.

According to an embodiment of the present disclosure, the pattern recognition can be carried out by means of template matching. To this end, according to an embodiment, the trunk recognition device 1033 may comprise a search part 1037 and a trunk template storage part 1038, as shown in FIG. 1B. The trunk template storage part 1038 can be configured to store a definable trunk template. The trunk template may be factory-definable and stored in the storage part in advance, or may be user-definable. The search part 1037 may be configured to search for candidate trunk part(s) in the image by means of template matching based on the trunk template stored in the storage part 1038.

Figure 2:
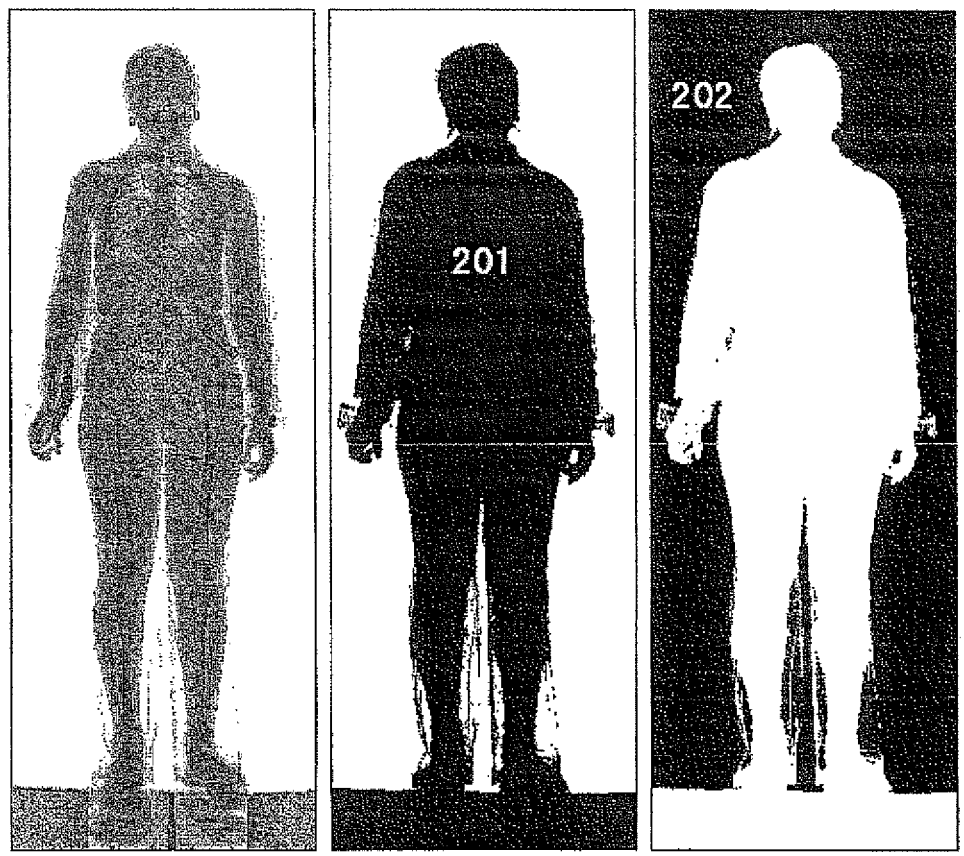
FIG. 2 is a schematic view showing segmentation of an original image into a foreground portion and a background portion according to an example of the present disclosure.

According to a further embodiment, the trunk recognition device 1033 may further comprise an image segmentation part 1039. The image segmentation part 1039 may be configured to segment the image into a foreground portion and a background portion, so that the template matching can be performed in the foreground portion, resulting in reduced computation loads. Such segmentation of the foreground and background portions can be done based on, for example, gray levels. Specifically, as shown in FIG. 2, a region of the original image where the gray level is less than a first threshold can be determined as the foreground portion (201), and a region where the gray level is greater than the first threshold can be determined as the background portion (202). Here, the first threshold may be determined based on experiences, or may be determined adaptively by means of histogram statistics.

It is to be noted that the segmentation of the foreground and background portions is not necessarily based on the gray levels. There are various ways to carry out the segmentation.

The template used in the pattern recognition can be defined in various ways. According to an embodiment, the trunk template may be defined based on a form factor. Specifically, a region of the body image with a (normalized) width greater than a certain value and a (normalized) length greater than a certain value can be defined as a trunk template, for example.

In the case where the image is segmented by the image segmentation part 1039 into the foreground and background portions, the above described trunk template based on the form factor may be defined to involve the following two ratios:

ratio a: $r_1^i/\max\{r_1^i\}$, where $r_1^i$ denotes the number of foreground pixels in a i-th pixel column, and $\max\{r_1^i\}$ represents the maximum among $r_1^i$; and ratio b: $r_2^j/\max\{r_2^j\}$, where $r_2^j$ denotes the number of foreground pixels in a j-th pixel row, and $\max\{r_2^j\}$ represents the maximum among $r_2^j$.

Here, i and j are indices for the pixel columns and rows, respectively. The trunk template may be defined as a number of successive columns with the ratio a greater than a second threshold and a number of successive rows with the ratio b greater than a third threshold. The second and third threshold values may be determined based on experiences.

With the trunk template defined as above, the search part 1037 may comprise following modules (not shown) to search for candidate trunk pattern(s) in the image: a calculating module configured to calculate the ratio a column by column and the ratio b row by row with respect to the foreground portion; a column boundary determining module configured to determine a left boundary (i.e., a first column boundary) as a leftmost column of a number of successive columns with the ratio a greater than the second threshold, and determine a right boundary (i.e., a second column boundary) as a rightmost column of the number of successive columns with the ratio a greater than the second threshold; and a row boundary determining module configured to determine an upper boundary (i.e., a first row boundary) as an uppermost row of a number of successive rows with the ratio b greater than the third threshold, and determine a lower boundary (i.e., a second row boundary) as a lowermost row of the number of successive rows with the ratio b greater than the third threshold. A region defined by those determined upper, lower, right, and left boundaries is determined as a candidate trunk pattern.

Figure 3:
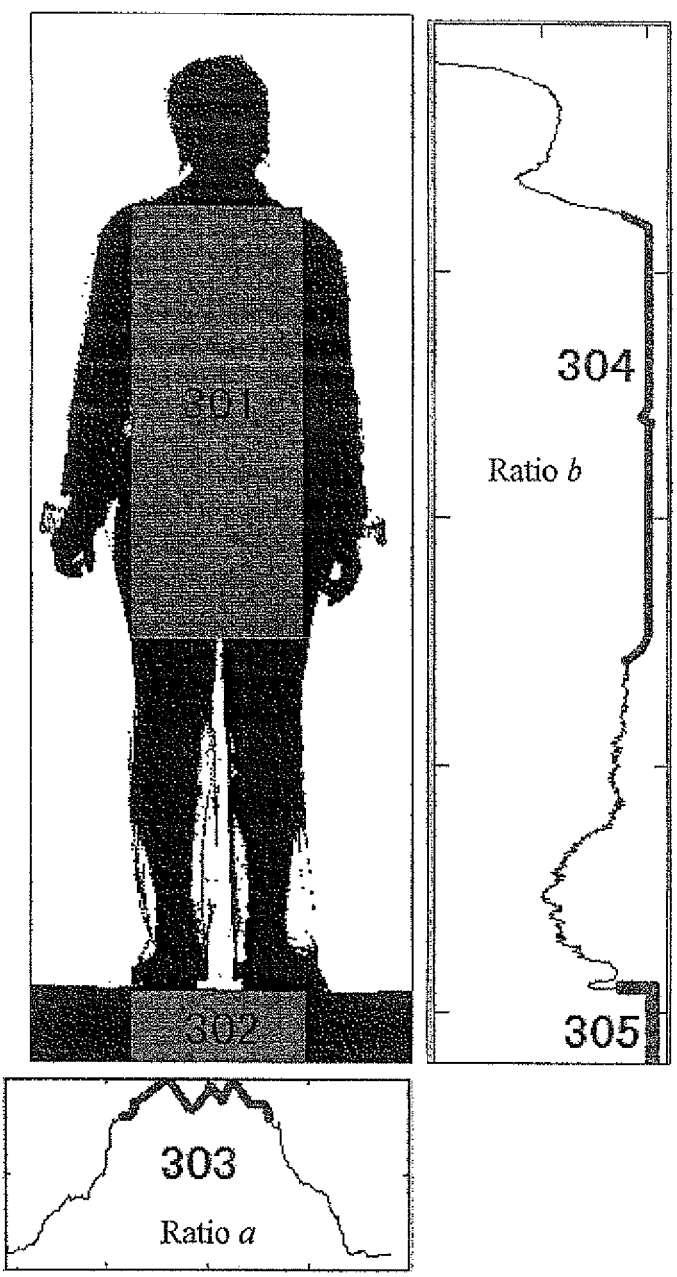
FIG. 3 is a schematic view showing recognition of a trunk part according to an example of the present disclosure.

For example, referring to FIG. 3, the ratio a (shown in the bottom block of FIG. 3) and the ratio b (shown in the right block of FIG. 3) are calculated with respect to the foreground portion of the image. A number of successive columns 303 with the ratio a greater than the second threshold, and a number of successive rows 304 and also a number of successive rows 305 with the ratio b greater than the third threshold, define two candidate trunk patterns 301 and 302, respectively.

According to an embodiment, when the left and right boundaries (e.g., the left-side boundary and the right-side boundary shown in FIG. 3) are determined based on the ratio a, a trunk width can be determined accordingly. For example, the trunk width in unit of pixel number may be equal to the number of pixel columns between the left and right boundaries. In the case where the trunk width is determined, the calculation of the ratio b can be limited to the trunk width, resulting in reduced computation loads. Specifically, the above described $r_2^j$ may be re-defined as the number of foreground pixels within the trunk width in the j-th pixel row. Actually, the ratio shown in FIG. 3 is calculated in this way. In this case, the third threshold can be adapted accordingly.

In this case, the search part 1037 may comprise, for example, the following modules (not shown): a first calculating module configured to calculate the ratio a for the respective pixel columns; a column boundary determining module configured to determine a left boundary (i.e., a first column boundary) as a leftmost column of a number of successive columns with the ratio a greater than the second threshold, and determine a right boundary a second column boundary) as a rightmost column of the number of successive columns with the ratio a greater than the second threshold; a trunk width determining module configured to determine a trunk width based on the determined left and right boundaries; a second calculating module configured to calculate the ratio b for the respective pixel rows, wherein the calculation is limited to the trunk width as described above; and a row boundary determining module configured to determine an upper boundary (i.e., a first row boundary) as an uppermost row of a number of successive rows with the ratio b greater than the third threshold, and determine a lower boundary (i.e., a second row boundary) as a lowermost row of the number of successive rows with the ratio b greater than the third threshold. A region defined by those determined upper, lower, right, and left boundaries is determined as a candidate trunk pattern.

According to an alternative embodiment, firstly the upper and lower boundaries may be determined based on the ratio b, and then a trunk length can be determined based thereon. Upon the determination of the trunk length, the calculation of the ratio a may be limited to the trunk length, resulting in reduced computation loads. Specifically, the above described $r_1^i$ may be re-defined as the number of foreground pixels within the trunk length in the i-th pixel column. In this case, the second threshold can be adapted accordingly.

Further, in the searching process, there may be two or more pairs of upper and lower boundaries and/or left and right boundaries, and thus may be two or more candidate trunk patterns. In the example shown in FIG. 3, there are a pair of left and right boundaries and also two pairs of upper and lower boundaries, resulting in two candidate trunk patterns 301 and 302. In this case, one of those candidate patterns with a largest area (in the example shown in FIG. 3, the pattern 301) can be determined as the true trunk.

In this way, the trunk recognition device 1033 can recognize the trunk part in the image, and thereby the head and/or crotch recognition device 1035 can recognize the head and/or crotch part based on the recognized trunk part.

Specifically, a portion of the image above the trunk part in the foreground portion may be determined as the head.

Figure 4:
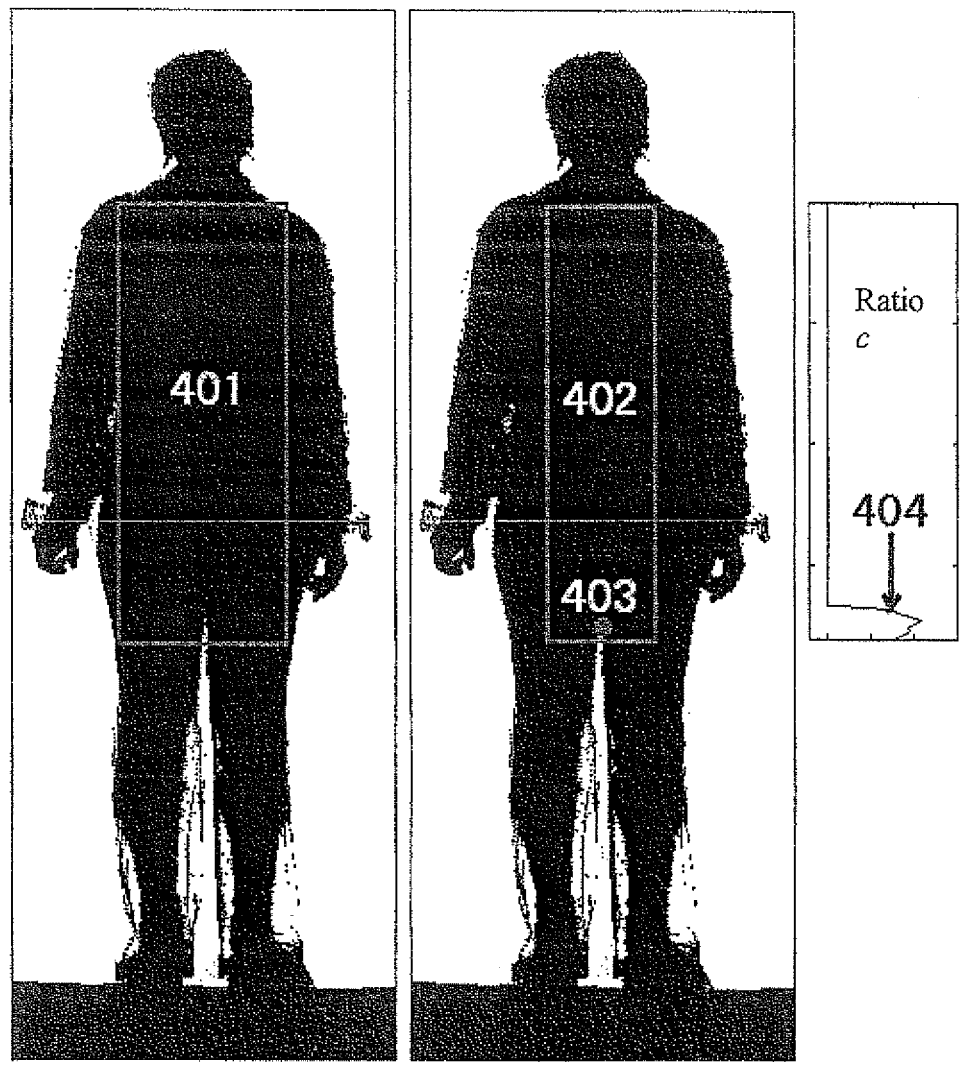
FIG. 4 is a schematic view showing recognition of a center position of a crotch part according to an example of the present disclosure.

Further, according to an embodiment of the present disclosure, the head and/or crotch recognition device 1035 may comprise a crotch determining module (not shown) to recognize the crotch part. For example, as shown in FIG. 4, the crotch determining module may be configured to determine an uppermost one (404) among the pixel rows with a ratio c (shown in the rightmost block of FIG. 4) greater than a fourth threshold in the trunk part 401. Here, the ratio c may be defined as a proportion of the number of pixels in a pixel row with a gray level greater than a fifth threshold to the trunk width. The fourth threshold may be determined based on experiences, and the fifth threshold may be determined based on experiences or may be determined adaptively based on the average gray level of the trunk (401). For example, to determine the above described uppermost pixel row, the crotch determining module can be configured to perform searching row by row from the top down in the trunk part (401), during which the ratio c is calculated for the respective rows. According to an embodiment, the searching can be limited to an extent (e.g. the extent 402 shown in FIG. 4) around a longitudinal center of the trunk (that is, a central column of the trunk part 401) to reduce the computation loads.

For the determined uppermost pixel row, the crotch determining module may be configured to determine a point among pixels in this row with a gray level greater than the fifth threshold, which is closest to the central column of the trunk part, as a crotch center 403. Further, the crotch determining module can be configured to determine a portion of the image in the foreground portion, which is centered at the crotch center 403 and has a certain radius, as the crotch part. Here, the radius may be determined based on experiences, or may be determined adaptively based on the trunk width.

Figure 5:
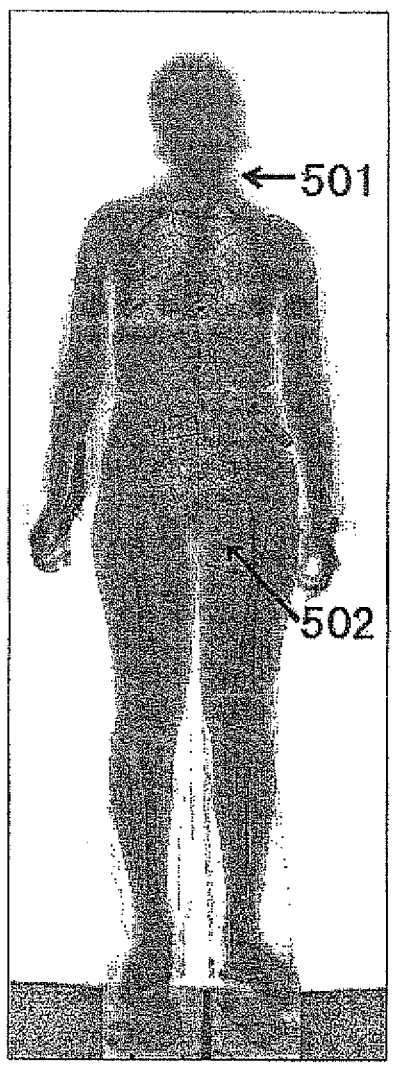
FIG. 5 is a schematic view showing privacy protection processing on the head and crotch parts according to an example of the present disclosure.

When the head and/or crotch recognition device recognizes the head and/or crotch part as described above, the processing unit 1032 can be configured to perform privacy protection processing on the recognized head and/or crotch part. For example, smoothing operations such as mean filtering or Gaussian filtering may be carried out so as to smooth and thus blur the head and/or crotch part. FIG. 5 shows an example of such processing.

According to a further embodiment, there is also provided a method of processing a body inspection image. Specifically, the method may comprise: recognizing a target region to be processed (for example, the head and/or crotch part) by means of pattern recognition, and performing privacy protection processing on the recognized target region. The privacy protection processing may comprise smoothing and thus blurring the target region so as to protect the privacy parts, for example.

The pattern recognition may be performed by means of template matching. The template can be defined based on the form factor, as described above. For more details of the method, reference may be made to the above descriptions, and they are omitted here.

In the above embodiments, the image is segmented into the foreground and background portions. However, the present disclosure is not limited thereto. More specifically, the segmentation of the foreground and background portions is not necessary for the present disclosure. For example, the above described first threshold may be incorporated into the determination of the ratio a and the ratio b, and thus there is no need for a separate image segmentation process. Specifically, the above described $r_1^i$ may be defined as the number of pixels in the i-th pixel column with a gray level less than the first threshold, and the above described $r_2^j$ may be defined as the number of pixels in the j-th pixel row with a gray level less than the first threshold.

Further, the present disclosure is not limited to the embodiment where the trunk part is recognized before the recognition of the head and/or crotch part. Instead, the head and/or crotch part can be directly recognized. Such recognition can be performed also by means of template matching. For example, a head and/or crotch template may be defined based on the anatomic characteristics of the human body. Further, the template for the trunk pattern recognition is not limited to that based on the form factor. Those skilled in the art can contemplate various templates for this purpose. Furthermore, the search part can adapt its searching operations to the particularly defined templates.

The image processing section can be implemented by software, hardware, firmware, and/or any combination thereof. The present disclosure is not limited to the implementations of the image processing section, which are not particularly limited. Furthermore, the modules described above each may be implemented by a separate entity or each may be implemented by several entities together, or at least some of them may be implemented by a same entity.

The above descriptions are just provided for illustrative purpose, instead of liming the present disclosure. Those skilled in the art should appreciate that the scope of the present disclosure is defined by the appended claims. Various modifications or replacements may be made without deviating from the spirit and principle of the present disclosure, and fall within the disclosure.

We claim:

1. A method of processing a body inspection image, comprising:
   recognizing a trunk part by performing template matching with a trunk template defined based on a form factor;
   determining a head and/or crotch part based on the recognized trunk part; and
   performing privacy protection processing on the determined part.

2. The method according to claim 1, wherein prior to the template matching the method further comprises:
   segmenting the image into a foreground portion and a background portion, wherein the template matching is performed in the foreground portion.

3. The method according to claim 2, wherein the segmentation of the foreground and background portions is based on gray levels.

4. The method according to claim 2, wherein recognizing the trunk part comprises:
   for pixel rows and pixel columns of the image,
   i) identifying a number of successive columns with a ratio a greater than a first threshold, wherein the ratio a is defined as $r_1^i/\max\{r_1^i\}$, where $r_1^i$ denotes the number of pixels in a i-th pixel column in the foreground portion, and $\max\{r_1^i\}$ represents the maximum among $r_1^i$ of the respective pixel columns, and wherein an leftmost one and a rightmost one of the number of successive columns define a first column boundary and a second column boundary, respectively; and
   ii) identifying a number of successive rows with a ratio b greater than a second threshold, wherein the ratio b is defined as $r_2^j/\max\{r_2^j\}$, where $r_2^j$ denotes the number of pixels in a j-th pixel row in the foreground portion, and $\max\{r_2^h\}$ represents the maximum among $r_2^j$ of the respective pixel rows, and wherein an uppermost one and a lowermost one of the number of successive rows define a first row boundary and a second row boundary, respectively,
   wherein the process of i) is performed firstly, and a trunk width is determined based on the first and second column boundaries, and then the process of ii) is performed, during which $r_2^j$ is defined as the number of pixels within the trunk width in the j-th pixel row in the foreground portion, and
   wherein a region defined by the first and second column boundaries and the first and second row boundaries is determined as the trunk part.

5. The method according to claim 4, wherein if two or more candidate trunk parts are found, then one with a largest area is determined as the trunk part.

6. The method according to claim 2, comprising:
   recognizing a portion of the image above the trunk part in the foreground portion as the head part.

7. The method according to claim 2, comprising:
   determining, in the recognized trunk part, an uppermost pixel row among pixel rows with a ratio c greater than a threshold, wherein the ratio c is defined as a proportion of the number of pixels in a pixel row with a gray level greater than a further threshold to a width of the trunk part;
   determining, for the determined uppermost pixel row, a point among pixels in this row with a gray level greater than the further threshold, which is closest to a central column of the trunk part, as a crotch center; and
   determining a portion of the image in the foreground portion, which is centered at the crotch center and has a certain radius, as the crotch part.

8. The method according to claim 7, wherein the ratio c is determined with respect to pixels within an extent around the central column of the trunk part.

9. The method according to claim 1, wherein the privacy protection processing comprises at least one of smoothing, masking, and edging.

10. The method according to claim 9, wherein the smoothing comprises at least one of mean filtering and Gaussian filtering.

11. A body inspection apparatus, comprising:
an image acquiring section configured to acquire a body inspection image by imaging a human body;
an image processing section configured to processing the acquired body inspection image to determine a head and/or crotch part, and including a process unit configured to perform privacy protection processing on the determined head and/or crotch part; and
an output section configured to output the image processed by the image processing section,
wherein the image processing section comprises:
a trunk recognition device configured to recognize a trunk part by performing template matching with a trunk template defined based on a form factor; and
a head and/or crotch recognition device configured to determine the head and/or crotch part based on the trunk part recognized by the trunk recognition device.

12. The body inspection apparatus according to claim 11, wherein the trunk recognition device comprises:
a template storage part configured to store the trunk template; and
a search part configured to search for the trunk part in the image by means of template matching with the trunk template stored in the template storage part.

13. The body inspection apparatus according to claim 12, wherein the trunk recognition device further comprises:
an image segmentation part configured to segment the image into a foreground portion and a background portion, wherein the search part is configured to perform the template matching in the foreground portion.

14. The body inspection apparatus according to claim 13, wherein the image segmentation part is configured to segment the image into the foreground and background portions based on gray levels.

15. The body inspection apparatus according to claim 13, wherein the search part comprises:
a calculating module configured to:
i) calculate a ratio a for each of pixel columns of the image, wherein the ratio a is defined as $r_1^i/\max\{r_1^i\}$, where $r_1^i$ denotes the number of pixels in a i-th pixel column in the foreground portion, and $\max\{r_1^i\}$ represents the maximum among $r_1^i$ of the respective pixel columns; and
ii) calculate a ratio b for each of pixel rows of the image, wherein the ratio b is defined as $r_2^j/\max\{r_2^j\}$, where $r_2^j$ denotes the number of pixels in a j-th pixel row in the foreground portion, and $\max\{r_2^j\}$ represents the maximum among $r_2^j$ of the respective pixel rows;
a column boundary determining module configured to determine a number of successive columns with the ratio a greater than a first threshold, wherein an leftmost one and a rightmost one of the number of successive columns define a first column boundary and a second column boundary, respectively; and
a row boundary determining module configured to determine a number of successive rows with the ratio b greater than a second threshold, wherein an uppermost one and a lowermost one of the number of successive rows define a first row boundary and a second row boundary, respectively,
a trunk width determining module configured to determine a trunk width based on the first and second column boundaries;
wherein the search part is configured to determine a region defined by the first and second column boundaries and the first and second row boundaries as the trunk part.

16. The body inspection apparatus according to claim 15, wherein the search part is configured to determine, if two or more candidate trunk parts are found, one with a largest area as the trunk part.

17. The body inspection apparatus according to claim 13, wherein the head and/or crotch recognition device is configured to recognize a portion of the image above the trunk part in the foreground portion as the head part.

18. The body inspection apparatus according to claim 13, wherein the head and/or crotch recognition device comprises:
a crotch determining module configured to
determine, in the trunk part found by the search part, an uppermost pixel row among pixel rows with a ratio c greater than a threshold, wherein the ratio c is defined as a proportion of the number of pixels in a pixel row with a gray level greater than a further threshold to a width of the trunk part;
determine, for the determined uppermost pixel row, a point among pixels in this row with a gray level greater than the further threshold, which is closest to a central column of the trunk part, as a crotch center; and
determine a portion of the image in the foreground portion, which is centered at the crotch center and has a certain radius, as the crotch part.

19. The body inspection apparatus according to claim 18, wherein the ratio c is determined with respect to pixels within an extent around the central column of the trunk part.

20. The body inspection apparatus according to claim 11, wherein the privacy protection processing comprises at least one of smoothing, masking, and edging.

21. The body inspection apparatus according to claim 20, wherein the smoothing comprises at least one of mean filtering and Gaussian filtering.

* * * * *